United States Patent [19]
Yoshimizu et al.

[11] Patent Number: 5,249,071
[45] Date of Patent: Sep. 28, 1993

[54] LIQUID CRYSTAL DISPLAY HAVING POSITIVE AND NEGATIVE UNIAXIALLY ORIENTED POLYMER FILMS

[75] Inventors: Toshiyuki Yoshimizu, Ikoma; Hiroshi Ohnishi, Nara; Yumi Yoshimura, Yamatokooriyama; Keiko Kishimoto, Osaka, all of Japan

[73] Assignee: Sharp Kabushiki Kaisha, Osaka, Japan

[21] Appl. No.: 795,324

[22] Filed: Nov. 20, 1991

[30] Foreign Application Priority Data

Nov. 22, 1990 [JP] Japan .................. 2-318746

[51] Int. Cl.⁵ .......................... G02F 1/1335
[52] U.S. Cl. .......................... 359/63; 359/73
[58] Field of Search .................. 359/73, 63

[56] References Cited

U.S. PATENT DOCUMENTS

| | | | |
|---|---|---|---|
| 5,089,906 | 2/1992 | Ohnishi et al. | 359/63 |
| 5,093,739 | 3/1992 | Aida et al. | 359/73 |
| 5,124,824 | 6/1992 | Kozaki et al. | 359/73 |
| 5,138,474 | 8/1992 | Arakawa | 359/73 |
| 5,189,538 | 2/1993 | Arakawa | 359/63 |

FOREIGN PATENT DOCUMENTS

| | | | |
|---|---|---|---|
| 0367288 | 5/1990 | European Pat. Off. | 359/73 |
| 0372973 | 6/1990 | European Pat. Off. | 359/73 |
| 63-53528 | 10/1988 | Japan . | |
| 63-53529 | 10/1988 | Japan . | |
| 0067518 | 3/1990 | Japan | 359/73 |
| 0013917 | 1/1991 | Japan | 359/73 |
| 3-73921 | 3/1991 | Japan . | |
| 3-215826 | 9/1991 | Japan . | |
| WO90/11546 | 10/1990 | PCT Int'l Appl. . | |
| 90/16006 | 12/1990 | World Int. Prop. O. | 359/73 |

Primary Examiner—John S. Heyman
Assistant Examiner—Anita Pellman Gross

[57] ABSTRACT

In a supertwist type liquid crystal display, a pair of upper and lower polarizers and polymer films are disposed in such an arrangement that the upper polarizer, first uniaxial oriented polymer film, second uniaxial oriented polymer film, supertwist type liquid crystal cell, third uniaxial oriented polymer film, first biaxial oriented polymer film and the lower polarizer are sequentially piled on in this order, and each of said first, second and third uniaxial oriented polymer films has a positive optical anisotropy and said first biaxial oriented polymer film has a negative optical anisotropy.

14 Claims, 7 Drawing Sheets

FIG. 1

RETARDATION FILM

FIG. 2

Fig.3 viewing direction = 12:00

Fig.4 viewing direction = 12:00

Fig.5 viewing direction = 12:00

viewing direction = 12:00

Real Line a : Using biaxial film of 400nm thick
Broken Line b : Using biaxial film of 250nm thick
Dotted Line c : Using no biaxial film

LIQUID CRYSTAL DISPLAY HAVING POSITIVE AND NEGATIVE UNIAXIALLY ORIENTED POLYMER FILMS

BACKGROUND OF THE INVENTION

1. Field of the Invention

The present invention relates to a liquid crystal display, and in particular to a supertwist type liquid crystal display with an improved optical compensating plate.

2. Description of the Prior Art

In general, a supertwist type liquid crystal display intrinsically shows a yellow-green or blue color due to the birefrengence of its liquid crystal layer, which can be converted to a bright and clean black-and-white display through color correction using an optical compensator. By this color correction, the display quality is upgraded to a level which enables the liquid crystal display to be utilized for various office automation equipment such as word processors, computers and the like.

Supertwist type liquid crystal displays with color correction of a double-layered type are available and are disclosed, for example, in the Japanese Patent Publications 63-53528 and 63-53529 and in the May Publication of Nitto-Giho in 1989, vol. 27-1, pages 46-53, wherein a coloring made in the first layer acting as a driving panel is color-corrected to provide a display of achromatic color in the second layer acting as an optical compensating panel. This double-layered structure provides a clear black-and-white display with upgraded visibility in comparison with a single-layered supertwist type liquid crystal display. However, since two or more liquid crystal panels are required, this display has problems of being thick in depth and having an increased weight.

In order to solve these problems, the present inventors have developed a thin and light supertwist type liquid crystal display by utilizing an optical retardation film as an optical compensator which is composed of an organic polymer film as disclosed in the Japanese Patent Application 1-262624. However, the retardation film is composed of a uniaxial oriented polymer film which is one of the optical retardation film made of organic polymer film, and since this retardation film is fabricated by extending a polymer film, there arises a difference in its optical nature between the extending direction of the film and the direction perpendicular to the extension. This then will cause another problem that this supertwist type liquid crystal display utilizing a retardation film has a greater color change in its azimuth direction or elevation direction in comparison with a double-layered supertwist type liquid crystal display utilizing an optical compensating panel which has the same optical nature as that of a liquid crystal display layer (although the optical rotatory directions are reversed therebetween). That is, the supertwist type liquid crystal display utilizing a retardation film has a problem that the optical compensating effect is insufficient, in other words, its viewing angle is narrow in comparison with the double-layered supertwist type liquid crystal display.

Next, optical natures of a uniaxial oriented polymer film and a biaxial oriented polymer film are described below, which are utilized in the present invention as a retardation film.

A uniaxial oriented polymer film is obtained by thermally extending a polymer film in a uniaxial direction after forming the film. A biaxial oriented polymer film is obtained by thermally extending a polymer film in biaxial directions (generally perpendicular) after forming the film.

Referring to the optical nature thereof, when assuming that the refractive indices of the film in the three dimensions are nx (in the extending direction), ny (in a direction perpendicular to the extension) and nz (in the thickness direction), the following relationships are present. However, in a biaxial oriented polymer film, ny is also a refractive index in an extending direction.

In a positive uniaxial oriented polymer film, a relationship is indicated as follows:

$$nx > ny \geqq nz$$

In a negative uniaxial oriented polymer film, a relationship is indicated as follows:

$$ny \geqq nz > nx$$

Generally, since a direction of a film having the maximum refractive index is set in a direction of its slow axis (phase lagging axis or S-axis), the slow axis of a positive uniaxial oriented polymer film is coincident with the extending direction of the film, and the slow axis of a negative uniaxial oriented polymer film is coincident with the direction perpendicular to the extension of the film.

In a biaxial oriented polymer film, the extending factors are made so different as to set the biaxially extending directions to be equal, that is, the relationship between the optical refractive indices in the biaxial extending directions is represented by nx=ny. In this case, therefore, the retardation value in the plane of the film is zero, resulting in that the biaxial oriented polymer film does not act as an optical retardation film.

The uniaxial oriented polymer film is utilized as a retardation film for its optical anisotropy. That is, in this arrangement, there is a difference in the refractive indexes of the film between the extended direction of the film and the direction perpendicular to the extension, which is referred to as birefrengence (or double refraction). This birefrengence is a physical phenomenon which occurs in an optically anisotropic substance because the anisotropic substance has different refractive indexes with respect to linear polarized rays having different planes of vibration each other. That is to say, the retardation means a retardation between the phase velocity (or normal velocity) of an ordinary ray and that of an extraordinary ray, wherein an ordinary ray means a ray with a constant phase velocity (refractive index) irrespective of the direction of the light propagating direction in the substance and the extraordinary ray means a ray of which phase velocity (refractive index) is different depending on the propagating direction of light in the substance. Assuming that, the retardation is (R), the refractive index with respect to the extraordinary ray is (ne), the refractive index with respective to the ordinary ray is (no) and that the thickness of the film is (d), the retardation R is represented as follows:

$$R = \Delta n \times d \tag{1}$$

wherein $\Delta n = |ne - no|$.

That is, the retardation ($\Delta n \cdot d$) given by the product of this refractive index anisotropy ($\Delta n$) and the thickness (d) of the film is a physical quantity defining the retardation of light determined when it passes through the film, and the change of the retardation with respect to the elevation angle is different between the extended direction of the film and the direction perpendicular to the extension thereof.

Figure 1:
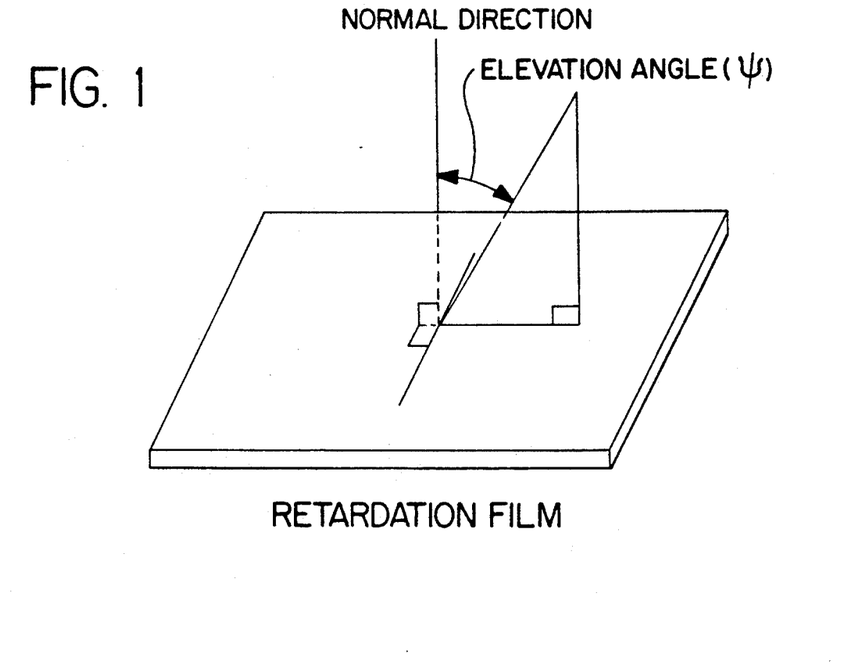
FIG. 1 is a schematic diagram showing a relationship between a normal direction and an elevation angle with respect to a retardation film having an optical anisotropy.

FIG. 1 shows a relationship between the normal direction and the elevation angle ($\psi$) in the retardation film having optical anisotropy.

Figure 2:
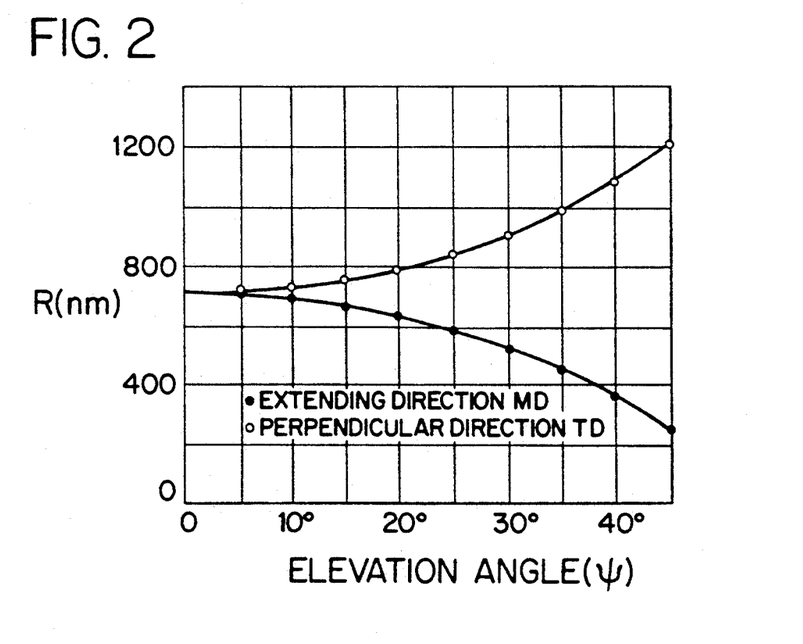
FIG. 2 is a graph view showing a relationship between an elevation angle and a retardation value of a uniaxial oriented polymer film having a positive optical anisotropy.

FIG. 2 shows a relationship between the elevation angle $\psi$ represented by the horizontal axis and the retardation value R (nanometers) represented by the vertical axis in one example of a retardation film having positive optical anisotropy composed of a uniaxial oriented polymer film made from polycarbonate. As shown by · marks in FIG. 2, the larger the elevation angle $\psi$, the smaller the retardation value is in the extended direction (the direction of the slow axis, S-axis, referred to as MD hereinafter) of the uniaxial oriented polymer film, while as shown by ○ marks, the larger the elevation angle, the larger the retardation value increases in the direction (of the fast axis (phase advancing axis), F-axis which is referred to as TD hereinafter) which is perpendicular to the extended direction of the uniaxial oriented polymer film.

In addition, although the case of the retardation film having a negative optical anisotropy is not shown by a figure, the results are opposite to those of the case shown in FIG. 2. That is, when the elevation angle becomes larger, the retardation in the extended direction of the uniaxial oriented polymer film (in the fast axis) decreases, on the other hand, the retardation increases in the direction (slow axis) which is perpendicular to the extended direction of the uniaxial oriented polymer film.

When a retardation film is combined with a liquid crystal display cell, even though the optical compensation is complete in the normal direction, the difference between the retardation of the retardation film and the retardation of the liquid crystal display cell increases as the elevation angle increases, so that the optical compensating relationship is unbalanced. That is, an increased difference between the retardation of the retardation film and that of the liquid crystal display cell will cause light passing through an assembly to have a retardation to result in a colored display. That is, no color compensation is performed and hence narrower viewing angles will result because of deterioration of contrast of the display.

In a supertwist type liquid crystal display utilizing an optical compensator composed of a uniaxial oriented polymer film, there can be obtained a bright and clean display with good visibility in comparison with that of a conventional yellow mode supertwist type liquid crystal display. Therefore, the supertwist type liquid crystal display with an optical compensator composed of a uniaxial oriented polymer film is used as a display unit in many fields such as a display of word-processors or personal computers of lap top type and book type in recent years. In such utilization fields as mentioned above, it is required that the viewing angle of the liquid crystal display is uniformly wide in the vertical and horizontal directions. However, on the other hand, it is required that each display should have a viewing angle suitably wide for its utilization purpose. For example, in a display for use in a telephone, the equipment including a display unit is placed in a horizontal plane in many cases, so that the viewing angle of the display should be especially wide in the frontward (six o'clock) direction. Moreover, in the case of a display for use in an elevator for indicating a number of floor, since the display unit is located in a position higher than the height of human eyes, the viewing angle of the display should be especially wide in the downward direction.

Figure 3:
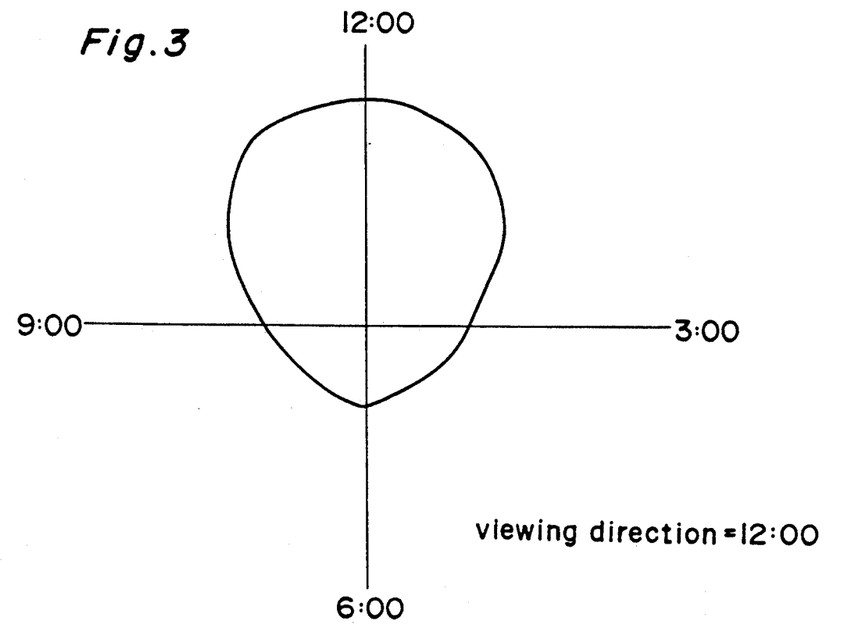
FIG. 3 is a schematic diagram showing a viewing angle character of an ordinary supertwist type liquid crystal display.

FIG. 3 shows a viewing angle character of a supertwist type liquid crystal display utilizing an optical retardation film composed of a polymer film as an optical compensator which is laminated on one side or both sides of the liquid crystal panel, which is disclosed in the Japanese Patent Application 01-262624 made by the present inventors. This looped line shows a viewing angle character corresponding to a contrast ratio Co ($Co \geq 4$) when a yellow mode liquid crystal display with a twist angle of 240 degrees is operated with a duty ratio of 1/240.

Figure 4:
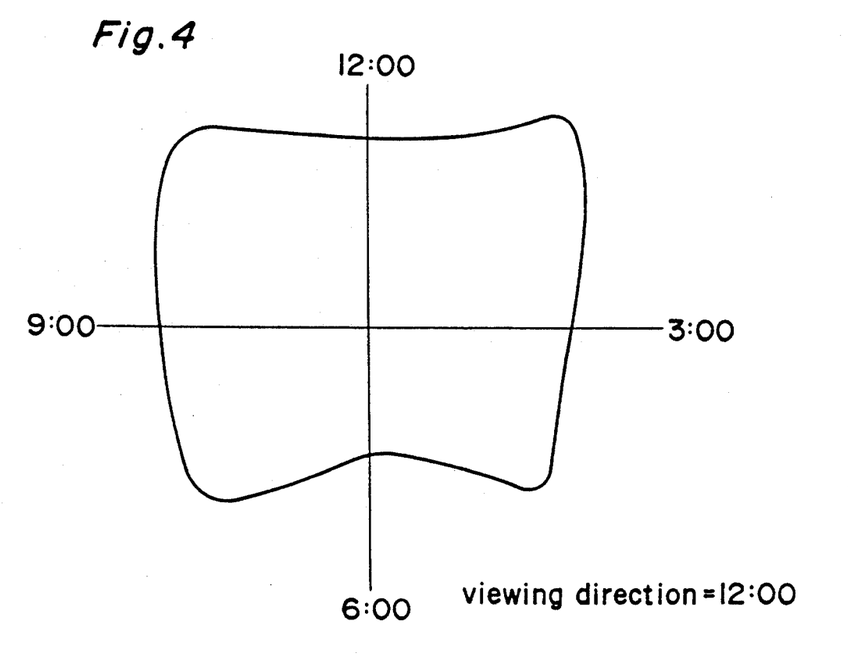
FIG. 4 is a schematic diagram showing a viewing angle character of a supertwist type liquid crystal display having a double-layered color compensating panel.

FIG. 4 shows another viewing angle character of a double-layered supertwist type liquid crystal display utilizing a liquid crystal panel as an optical compensator which is disclosed by the present inventors in the Japanese Patent Publications 63-53528 and 63-53529. This looped line also shows a viewing angle character corresponding to a contrast ratio Co ($Co \geq 4$) when a monochromatic mode liquid crystal display twisted by 240 degrees is operated with a duty ratio of 1/240. Although the viewing angle thereof is wide to some extent in all azimuths, the viewing angle character in any specific direction is not especially wide.

Figure 5:
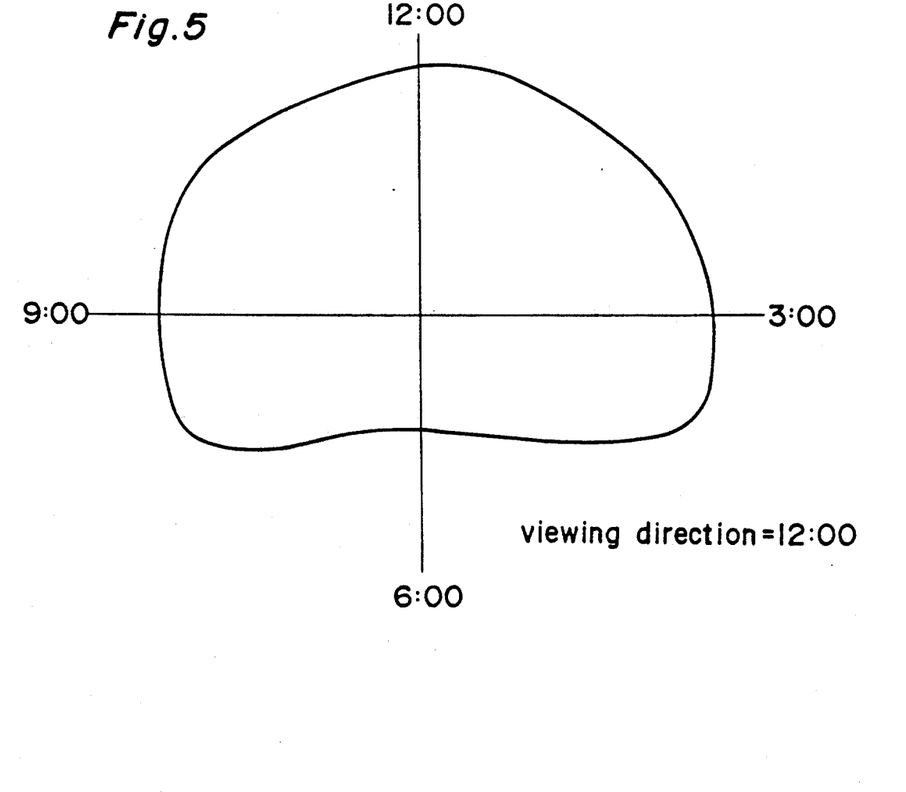
FIG. 5 is a schematic diagram showing a viewing angle character of a supertwist type liquid crystal display having a retardation film.

FIG. 5 shows a viewing angle character of a supertwist type liquid crystal display utilizing an optical retardation film composed of an organic polymer film as an optical compensator laminated on one side or both sides of a liquid crystal panel, which is disclosed in the Japanese Patent Application 02-011156 made by the present inventors. This looped line also shows a viewing angle character corresponding to a contrast ratio Co ($Co \geq 4$) when a monochromatic mode liquid crystal display twisted by 240 degrees is operated with a duty ratio of 1/240.

FIGS. 3, 4 and 5 show typical viewing angle characters of the conventional liquid crystal displays, and as shown by the figures, the viewing angle in any specific direction could not be significantly extended.

Since the viewing angle of the supertwist type liquid crystal display is mainly dependent on a twist angle of liquid crystal molecules and an orientation axis of the liquid crystal molecules when in operation, the viewing angle in a specific direction can not be extended without deteriorating the quality (performance) of display. Similarly, the double-layered supertwist type liquid crystal display utilizing an optical compensating panel is provided with two liquid crystal panels, and the viewing angle in a specific direction can not be significantly extended.

On the other hand, in a liquid crystal display utilizing a retardation film composed of a uniaxial oriented polymer film, the refractive index in the extended direction of the film is different from that in the direction perpendicular to the extension due to the anisotropy of refractive index peculiar to the uniaxial oriented polymer film. Therefore, the character of the viewing angle can be changed to some extent by selecting an optical fabricating method.

In a uniaxial oriented polymer film having a positive optical anisotropy, for example, a polymer film made from polyvinyl alcohol or a polymer film made from polycarbonate, the extended direction of the film is coincident with the direction of the slow axis and the direction perpendicular to the extension is coincident with the fast axis. Therefore, when viewing in a direction with an elevation angle ψ, the change of the retardation with respect to the elevation angle is different. As shown in FIG. 2, with increment of the elevation angle ψ, the retardation in the direction of the slow axis decreases, while the retardation in the direction of the fast axis increases. Therefore, the character of the viewing angle can be changed to some extent by selecting a suitable optical fabricating method. In this case, however, when combined with a liquid crystal panel, even though the optical compensation is completely performed in the normal direction, with increment of the elevation angle, the difference between the retardation of the uniaxial oriented polymer film and that of the liquid crystal panel becomes large, so that the relationship of the optical compensation is unbalanced. Consequently, there occurs a color change in the achromatizing degree so that the contrast ratio is deteriorated, resulting in a narrow viewing angle. Accordingly, also in this case, the viewing angle character in a specific direction can not be significantly extended.

SUMMARY OF THE INVENTION

It is an object of the present invention to eliminate such problems as mentioned above and its essential object is to provide a novel liquid crystal display in which a viewing angle character in a specific direction can be significantly extended.

In a single-layered or double-layered supertwist type liquid crystal display, a viewing angle character in a specific direction can not be significantly extended by merely changing a twist angle of liquid crystal molecules. According to experiments of various optical fabricating methods made by the present inventors, as disclosed in the Japanese Patent Application 2-011156, the present inventors found that the viewing angle character can be extended by combining a uniaxial oriented polymer film with a biaxial oriented polymer film. The present application relates to an improvement of the invention disclosed in the Japanese Patent Application 2-011156.

Referring to the optical nature thereof, when assuming that the refractive indexes in the three dimensions are nx (in the plane direction), ny (perpendicular to the direction of nx in the same plane) and nz (in the thickness direction), the following relationships exist. That is, in a positive uniaxial oriented polymer film:

$nx > ny \geq nz$

In a biaxial oriented polymer film, the following relationship exists:

$nz > nx = ny$

As a material of a biaxial oriented polymer film, methyl methacrylate (referred to as PMMA hereinafter) is available and development of other materials such as ethylene methacrylate (referred to as EMAA hereinafter) and polystyrene (referred to as PS hereinafter) is in progress. On the other hand, as a uniaxial oriented polymer film, polyvinyl alcohol (referred to as PVA hereinafter) and polycarbonate (referred to as PC hereinafter) having a positive optical anisotropy are available. If PMMA, EMAA and PS are processed as a uniaxial oriented polymer film, it is possible to obtain a film having a negative optical anisotropy.

Figure 10:
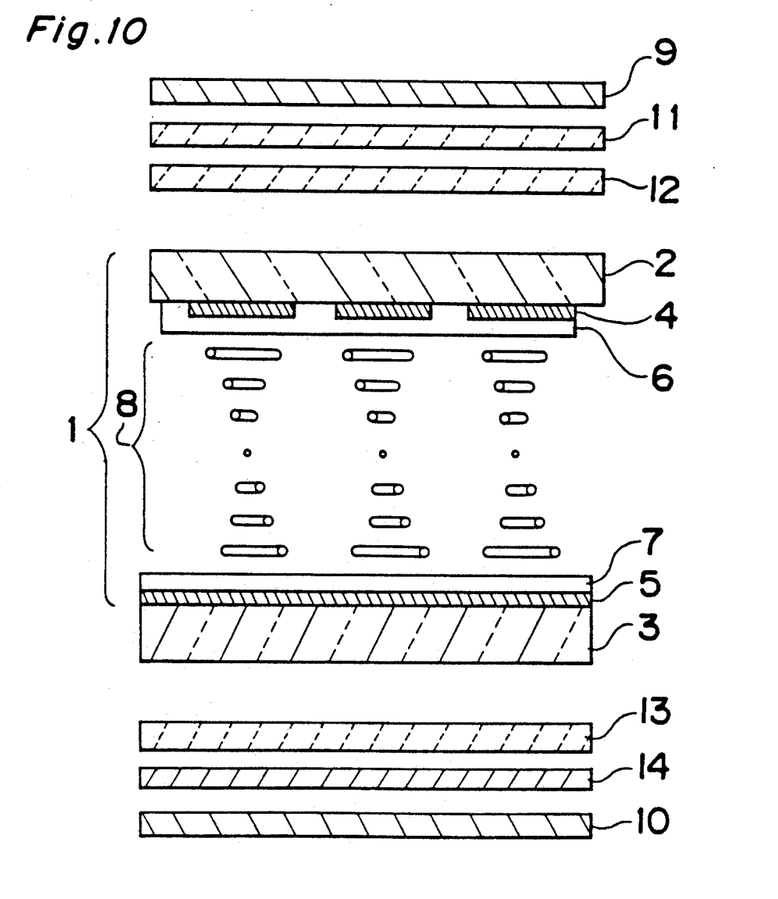
FIG. 10 is an exploded sectional view showing a structure of an embodiment of a liquid crystal display.

The present inventors examined various optical fabricating methods in order to extend a viewing angle character in a specific direction. According to these examinations, the inventors discovered a combination for obtaining an extended viewing angle character in a specific direction as follows. That is, when a uniaxial oriented polymer film is combined with a biaxial oriented polymer film under condition that the relationship $nx > nz > ny$ is satisfied, the change of the retardation with respect to the elevation angle can be reduced, so that the viewing angle character can be extended. However, with merely one conditional connection of $nx > nz > ny$, the viewing angle character in a specific direction could not be largely extended. In addition, according to further examinations of various combinations made by the present inventors, as shown in FIG. 10 of the present invention, the present inventors found that the viewing angle character in a specific direction can be further extended when the optical fabrication of the uniaxial oriented polymer film is arranged as follows.

According to a feature of the present invention, in a liquid crystal display provided with polarizer and polymer films disposed on a front surface and rear surface of a supertwist type liquid crystal panel, a uniaxial oriented polymer film having a positive optical anisotropy with a small retardation in a normal direction and a biaxial oriented polymer film having a negative optical anisotropy with a small retardation in the film plane are disposed as an optical compensator on the front surface or rear surface of the panel, whereby the object mentioned above can be attained.

According to another feature of the invention, in a liquid crystal display, polymer films are composed of uniaxial oriented polymer films and biaxial oriented films, which includes a first polarizer, a first uniaxial oriented polymer film, a second uniaxial oriented polymer film, a supertwist type liquid crystal cell, a third uniaxial oriented polymer film, a first biaxial oriented polymer film and a second polarizer, which are laminated in the order from the upper to the lower, wherein the first, second and third uniaxial oriented polymer films have positive optical anisotropy and the first biaxial oriented polymer film has a negative optical anisotropy, whereby the object mentioned above is accomplished.

According to still another feature of the invention, in a liquid crystal display, polymer films are composed of uniaxial oriented polymer films or biaxial oriented films, which includes a first polarizer, a first uniaxial oriented polymer film, a second uniaxial oriented polymer film, a supertwist type liquid crystal panel, a third uniaxial oriented polymer film, a first biaxial oriented polymer film and a second polarizer, disposed in that order, wherein the angle defined between the slow axis of the first uniaxial oriented polymer film and the slow axis of the second uniaxial oriented polymer film is in a range of 25 to 35 degrees, and the relationship between the slow axis of the second uniaxial oriented polymer film and the orientation axis of the liquid crystal molecules of the upper substrate of the liquid crystal panel adjacent thereto is in relation of decreasing retardation (phase reduction) to be described later, and the relationship between the slow axis of the third uniaxial oriented polymer film and the orientation axis of the liquid crystal molecules of the lower substrate of the liquid crystal display panel adjacent thereto is in relation of decreasing retardation, and the absorption axis of the first polarizer is inclined by approximately 15 degrees in a counterclockwise direction with respect to the slow axis of the first uniaxial oriented polymer film, and the absorption axis of the second polarizer is inclined by approximately 50 degrees in a counterclockwise direction with respect to the slow axis of the third uniaxial oriented polymer film, and the retardation in the normal direction of the first biaxial oriented polymer film is made approximately equal to the retardation in the plane of the adjacent third uniaxial polymer film, whereby the viewing angle in the direction of the orientation axis of the liquid crystal molecules of the upper substrate of the liquid crystal panel or the viewing angle in the slow axis of the third uniaxial oriented polymer film can be especially extended. Herein, the phase retardation means the relationship that, when two optical medium thin films having retardations R1 and R2 are layered, the retardation of the layered films is $|R1-R2|$, the relationship between the two films is referred to as "decreasing retardation (phase reduction)". On the other hand, when the retardation of the layered films amounts to $R1+R2$, the relationship between the two combined films is referred to as "increasing retardation (phase addition)".

In the supertwist type liquid crystal display having an optical compensator composed of uniaxial oriented polymer films, the optical compensation is performed by utilizing the optical anisotropy inherent to the uniaxial oriented polymer film. The optical anisotropy means an optical nature that the refractive indexes are different between the extending direction of the film and the direction perpendicular to the extension. In this case, when viewing in the normal direction, the relative retardation between the ordinary and extraordinary rays passing through the liquid crystal display panel is negated by the retardation, i.e., product of the anisotropy of refractive indexes $\Delta n$ and the thickness d of the film when the rays pass through the retardation film, otherwise, all of the wavelengths are set in the same phase. On the other hand, when viewing the display in an inclined direction with respect to the normal direction, that is, when considering a viewing angle character, the three dimensional refractive indexes of the retardation film should be considered. Assuming that the three dimensional refractive indexes of the retardation film are $N_{MD}$ (in the extending direction), $N_{TD}$ (in the direction perpendicular to the extending direction) and $N_{ZD}$ (in the thickness direction), and that the elevation angle is $\psi$ with respect to the normal direction of the retardation film, in the case of a retardation film having a positive optical anisotropy, the refractive index anisotropy and retardation (phase difference) are represented as follows:

(1) When viewing in the extending direction of the film, the refractive index anisotropy $\Delta N_{MD}$ is given by a following equation:

$$\Delta N_{MD} = \{N_{MD}^2 N_{ZD}^2/(N_{MD}^2 \sin^2\psi + N_{ZD}^2 \cos^2\psi)\}^{\frac{1}{2}} - N_{TD}$$

and the phase difference (retardation) is given as follows:

$$R_{MD} = \Delta N_{MD} d/\cos\psi$$

(2) When viewing in the direction perpendicular to the extending direction, the refractive index anisotropy is given by a following equation:

$$\Delta N_{TD} = N_{MD} - \{N_{TD}^2 N_{ZD}^2/(N_{TD}^2 \sin^2\psi + N_{ZD}^2 \cos^2\psi)\}^{\frac{1}{2}}$$

The phase difference (retardation) is given as follows:

$$R_{TD} = \Delta N_{TD} d/\cos\psi$$

In the above equations, as an example of a uniaxial oriented polymer film satisfying a relationship of $nx > ny \geq nz$, i.e., $N_{MD} > N_{TD} \geq N_{ZD}$, a retardation film made from polycarbonate having a positive optical anisotropy is available.

Figure 6:
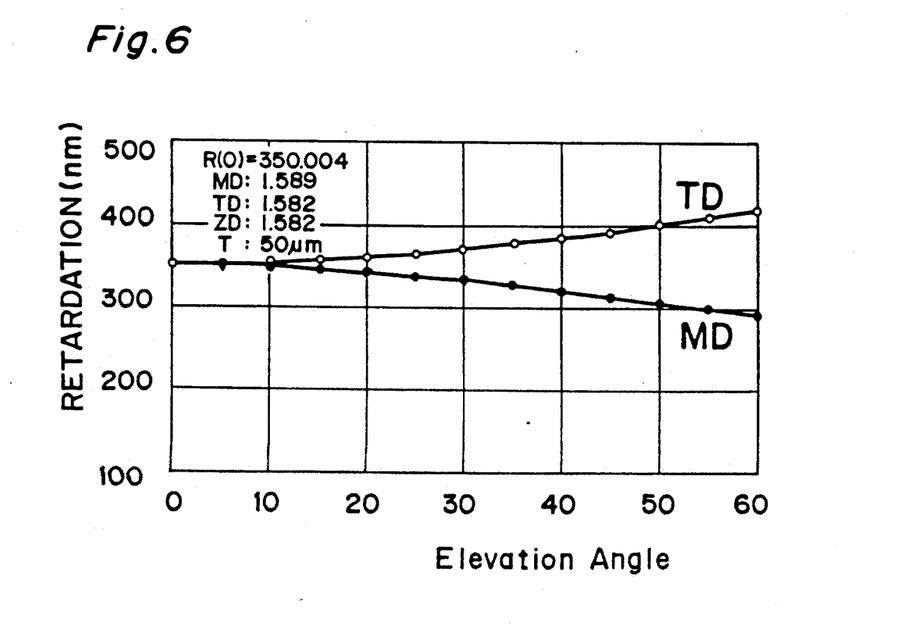
FIG. 6 is a graph view showing a relationship between an elevation angle and a retardation value of a uniaxial oriented polymer film having a positive optical anisotropy under condition of $nx > ny \geq nz$.

Assuming that the thickness d of the polymer film is 50 micrometers (d=50 μm), the three dimensional refractive indexes of the retardation film are $N_{MD}=1.589$, $N_{TD}=1.582$, $N_{ZD}=1.582$, and that the retardation R in the film plane is $R=(N_{MD}-N_{TD})\times d=350$ nanometers, these values are substituted in the above equation, and the change of the retardation with respect to the change of the elevation angle is represented as shown in FIG. 6, wherein the elevation angle is taken by the horizontal axis and the retardation is taken by the vertical axis. As the elevation angle increases, the retardation in the extending direction (i.e., the slow axis direction, S-axis or MD direction) of the uniaxial oriented polymer film decreases as shown by · marks, while the retardation in the direction perpendicular to the extending direction (i.e., fast axis, F-axis or TD direction) increases as shown by ○ marks.

Figure 7:
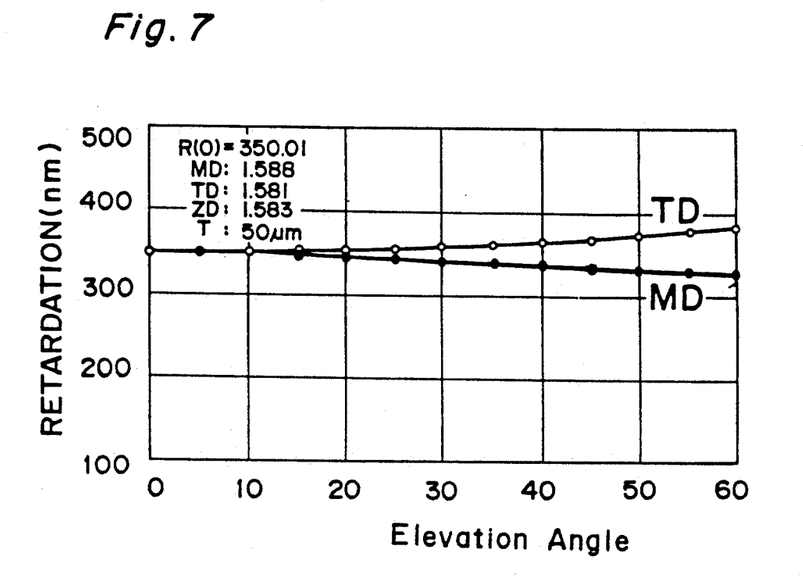
FIG. 7 is a graph view showing a relationship between an elevation angle and a retardation value of a uniaxial oriented polymer film having a positive optical anisotropy under condition of $nx > nz > ny$.

Moreover, in the case where the relationship of the three dimensional refractive indexes of the uniaxial oriented polymer film is represented as $nx > nz > ny$, i.e., $N_{MD} > N_{ZD} > N_{TD}$, assuming that the thickness of the polymer film is d=50 micrometers, the three dimensional refractive indexes of the retardation film are $N_{MD}=1.588$, $N_{TD}=1.581$, $N_{ZD}=1.583$, and that the retardation in the film plane is $R=(N_{MD}-N_{TD})\times d=350$ nanometers, these values are substituted in the above equation and the change of the retardation with respect to the elevation angle is obtained as shown in FIG. 7.

Figure 8:
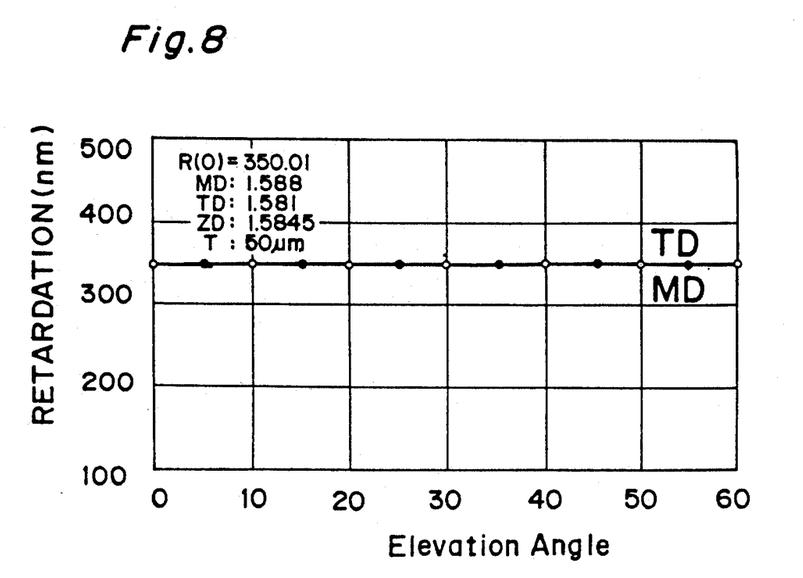
FIG. 8 is a graph view showing a relationship between an elevation angle and a retardation value of a uniaxial oriented polymer film having a positive optical anisotropy under condition of $nx > nz > ny$ and $2nz = nx + ny$.

As a result, when the relationship of the three dimensional refractive indexes is represented as $nx > nz > ny$, i.e., $N_{MD} > N_{ZD} > N_{TD}$, the change of the retardation with respect to the elevation angle can be reduced. Especially, when the relationship is represented as $2nz = nx + ny$, i.e., $2N_{ZD} = N_{MD} + N_{TD}$, when calculating by substituting the values, for example, $N_{ZD}=1.5845$, $2N_{ZD}=3.1690$, $N_{MD}+N_{TD}=1.588+1.581=3.169$, there can be obtained a condition in which there is no change of the retardation irrespective of the elevation angle as shown in FIG. 8. If there can be obtained a structure with such an optical anisotropy condition without change of retardation irrespective of an elevation angle, the viewing angle in a specific direction can be significantly extended. However, there has not been realized yet such a uniaxial oriented polymer film as to satisfy the relationship of $nx > nz > ny$, i.e., $N_{MD} > N_{ZD} > N_{TD}$.

Therefore, the present inventors developed a combination of laminated films for satisfying the relationship of $nx > nz > ny$ by combining a biaxial oriented polymer film having a small absolute value of a retardation (preferably not more than 20 nanometers) in the film plane and a large refractive index in the normal direction (i.e., satisfying the relationship nz > nx = ny), with a uniaxial oriented polymer film having a large absolute value of a retardation in the film plane and a small refractive index in the normal direction (i.e., satisfying the relationship nx > ny ≧ nz). In this case, by the equation 2nz = nx + ny, it is optimum that the retardation value in the plane of the uniaxial oriented polymer film is approximately equal to the retardation value of the biaxial oriented polymer film in the normal direction thereof. By this combination of a selected uniaxial oriented polymer film with a selected biaxial oriented polymer film, there can be obtained a retardation film with reduced change of a retardation with respective to the elevation angle, and when combined with a liquid crystal panel, the viewing angle character can be expanded. However, even in this case, the viewing angle character in a specific direction can not be expanded.

The present inventors examined various optical fabricating methods and found that the viewing angle character in a specific direction can be expanded by a method as follows:

The selected first uniaxial oriented polymer film is combined with the selected biaxial oriented polymer film to obtain a laminated film combination, which is disposed on one side of the liquid crystal panel. On the other side of the liquid crystal panel, the selected second uniaxial oriented polymer film is combined with the first uniaxial oriented polymer film so as to be laminated in such a manner that the slow axis of the second uniaxial oriented polymer film is oriented with approximately 30 degrees with respect to the slow axis of the first uniaxial oriented polymer film, whereby the viewing angle character in a specific direction can be expanded.

The present inventors further examined the angle (of approximately 30 degrees) between the slow axis of the second uniaxial oriented polymer film and the lagging axis of the first oriented polymer film.

Figure 9:
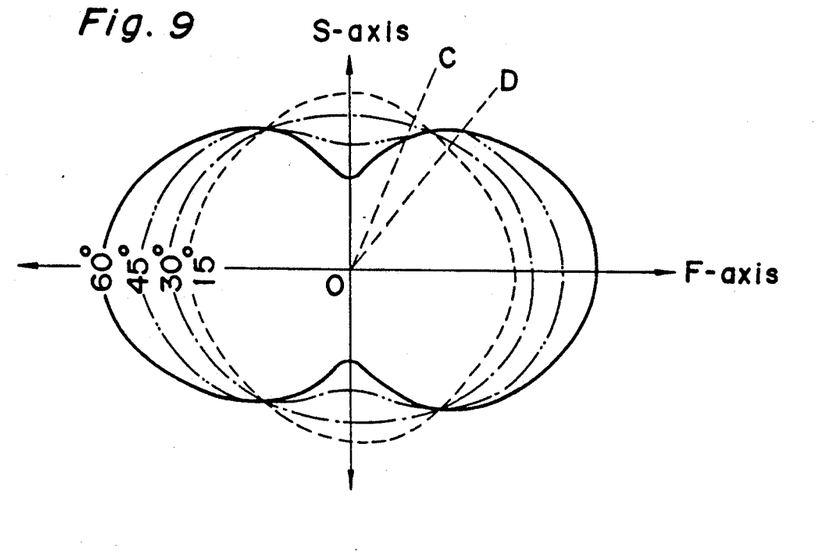
FIG. 9 is a schematic diagram showing a relationship between an azimuth angle and a retardation value with respect to the respective elevation angles of the uniaxial oriented polymer film.

In the case where polycarbonate is used as an example of the uniaxial oriented polymer film, FIG. 9 shows a change of the elevation angle with respect to the azimuth angle. In FIG. 9, the S-axis of the slow axis direction is taken by the vertical axis and the change of the elevation angle is shown with respect to the azimuth angle in the cases where the elevation angles are 15, 30, 45 and 60 degrees. As shown by the respective loop lines, it is understood that, in the range between the angle SOC and the angle SOD, the change of the azimuth angle is suppressed to be small with respect to the elevation angles. As a practical use, a range of 20 to 45 degrees, preferably 25 to 35 degrees is available.

As shown in FIG. 9, when examining the change of the retardation with respect to the elevation angle in the uniaxial oriented polymer film, it is understood that, when taking the azimuth angle of approximately 30 degrees with respect to the slow axis, the change of the retardation with respect to the elevation angle can be suppressed. That is, when the uniaxial oriented polymer film is laminated with its slow axis crossing with an angle of approximately 30 degrees (in a range of 25 to 35 degrees), the change of the retardation with respect to the elevation angle can be reduced and the viewing angle character can be effectively expanded. By disposing the uniaxial oriented polymer film laminated with a crossing angle of approximately 30 degrees and the laminated films which is a combination of the selected first uniaxial oriented polymer film with the selected biaxial oriented polymer film on the front and rear surfaces of the liquid crystal panel respectively, the viewing angle character can be expanded in the slow axis direction of the uniaxial oriented polymer film of the laminated uniaxial and biaxial oriented polymer films from the liquid crystal orientation axis direction which is adjacent to the upper glass substrate of the liquid crystal panel.

The optical principle of the action about the expansion of the viewing angle character is under examination in detail and it may be understood as follows.

It is considered that this is mainly because the expansion of the viewing angle character due to the laminated uniaxial oriented polymer film disposed on the front surface of the liquid crystal panel can be obtained by the action breaking the symmetry of the optical birefringence of the combined laminated films of uniaxial and biaxial oriented polymer films disposed on the rear surface of the panel. In this case, when the retardation value in the normal direction of the biaxial oriented polymer film is made approximately equal to the retardation value in the plane of the third uniaxial oriented polymer film adjacent thereto, the viewing angle character can be remarkably expanded.

BRIEF DESCRIPTION OF THE DRAWINGS

The present invention will become more fully understood from the detailed description given hereinbelow and the accompanying drawings which are given by way of illustration only, and these are not limitative of the present invention, and wherein:

FIGS. 10 to 14 are diagrams for explaining an embodiment of a liquid crystal display according to the present invention, wherein

DETAILED DESCRIPTION OF THE PREFERRED EMBODIMENT

A preferred embodiment of a liquid crystal display of the present invention will be described with reference to FIGS. 10 to 14 hereinbelow.

Referring to FIG. 10, a supertwist type liquid crystal panel 1 comprises a pair of upper and lower glass substrates 2 and 3 on the inner surfaces of which transparent electrodes 4 and 5 each having a predetermined pattern are disposed respectively. A pair of upper and lower orientation films 6 and 7 are disposed covering over the inner surfaces of the transparent electrodes 4 and 5 respectively. A liquid crystal layer 8 is interposed between the upper and lower orientation films 6 and 7. The upper and lower orientation films 6 and 7 is made of organic polymer such as polyimide, which is subjected to a rubbing process to constitute a twist structure of the liquid crystal layer 8 twisted by 240 degrees.

As a material of the liquid crystal layer 8, there is used a nematic liquid crystal having a positive optical anisotropy, for example, a mixed liquid crystal composed of phenyl cyclohexane (PCH) group liquid crystal mixed with cholesteryl nonanoate (CN) added by 1.45 percentage in weight as a chiral dopant for regulating the direction of the twist. The refractive index anisotropy $\Delta n$ of the mixed liquid crystal is 0.123 and the thickness thereof is set to 7.5 micrometers.

On the outer surfaces of the upper and lower glass substrates 2 and 3, a second and a third uniaxial oriented polymer films 12 and 13 are disposed respectively. Further on the outer surfaces thereof, a first uniaxial oriented polymer film 11 and a first biaxial oriented polymer film 14 are respectively disposed. Further on the outer surfaces thereof, a pair of upper and lower polarizers 9 and 10 are respectively disposed. The upper and lower polarizers 9 and 10 are neutral gray typed ones having their light transmittance of 42% and polarization degree of 99.99% in a unit body. The first and second uniaxial oriented polymer films 11 and 12 are used as retardation films having a positive optical anisotropy, and the thicknesses d1 and d2 thereof are set to 50 micrometers respectively (d1=d2=50 μm). The retardation values in the planes thereof are respectively set to 200 nanometers. The first and second uniaxial oriented polymer films 11 and 12 are disposed in such a manner that the angle between the slow directions thereof are set to preferably 25 to 35 degrees (approximately 30 degrees).

As a material of a uniaxial oriented polymer film, polycarbonate (PC) and polyvinyl alcohol (PVA) are available, and the uniaxial oriented polymer films made from polycarbonate are used in this embodiment. The third uniaxial oriented polymer film 13 has its thickness of 50 micrometers (d3=50 μm), which is made from polycarbonate, and which is used as a retardation film having a positive optical anisotropy. The retardation value in the plane thereof is set to 400 nanometers. The first biaxial oriented polymer film 14 having its thickness of 0.2 to 0.3 millimeters (d4=0.2~0.3 mm) is used as a retardation film having a negative optical anisotropy and the retardation value in the plane thereof is made extremely small (preferably not more than 20 nanometers), while two kinds of the first biaxial oriented polymer films 14 are used, having retardation values 250 nm and 400 nm respectively different from each other in the normal directions thereof. As a material of the biaxial oriented polymer film 14, polystyrene (PS), poly methacrylate methyl or the like is available, and in this embodiment the biaxial oriented polymer film made from poly methacrylate methyl is used as a retardation film having a negative optical anisotropy.

Figure 11:
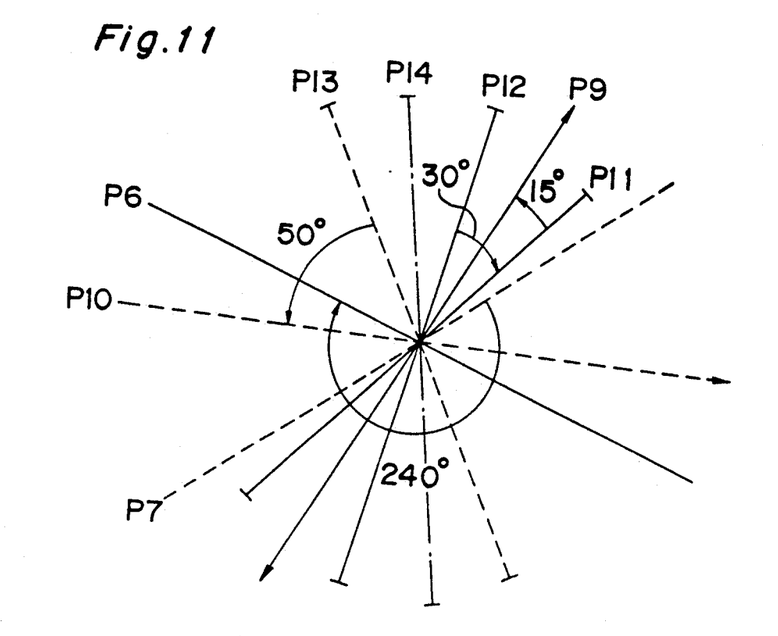
FIG. 11 is an explanatory diagram for showing an optical arrangement of parts of an embodiment of a liquid crystal display.

FIG. 11 shows an optical arrangement condition of respective optical members in the embodiment shown in FIG. 10, wherein P9 represents the direction of the absorbing axis of the upper polarizer 9, and P10 represents the direction of the absorbing axis of the lower polarizer 10. P11 and P12 represent the directions of the slow axes of the first and second uniaxial oriented polymer films 11 and 12 used as a retardation film having a positive optical anisotropy respectively. P6 and P7 represent the directions of the liquid crystal molecular orientation axes (rubbing axes) of the orientation films 6 and 7 formed on the inner surfaces of the upper and lower glass substrates 2 and 3, having a twist angle therebetween twisted by 240 degrees in the clockwise direction. P13 represents the direction of the slow axis of the third uniaxial oriented polymer film 13 used as a retardation film having a positive optical anisotropy, and P14 represents the direction of the slow axis of the first biaxial oriented polymer film 14 used as a retardation film having a negative optical anisotropy. However, since the retardation value in the plane of the first biaxial oriented polymer film 14 is extremely small (not more than 20 nm) as mentioned above, the first biaxial oriented polymer film 14 may be arranged in any direction. P11 is oriented at approximately 30 degrees in the clockwise direction with respect to P12, and P9 is oriented at approximately 15 degrees in the counterclockwise direction with respect to P11. Moreover, P10 is oriented at approximately 50 degrees in the clockwise direction with respect to P13. The relationship between P12 and P6 which are adjacent to the liquid crystal panel 1 is in relation of decreasing retardation and also the relationship between P13 and P7 is in relation of decreasing retardation.

Figure 12:
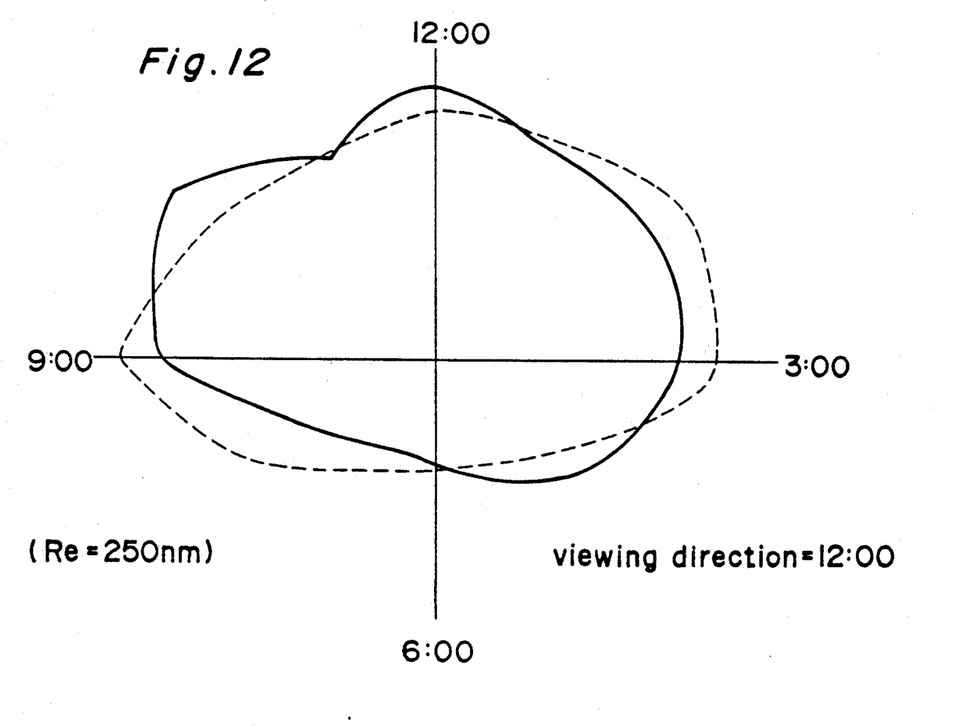
FIGS. 12 and 13 are schematic diagrams each showing an enlarged viewing angle character of an embodiment of a supertwist type liquid crystal display.
Figure 13:
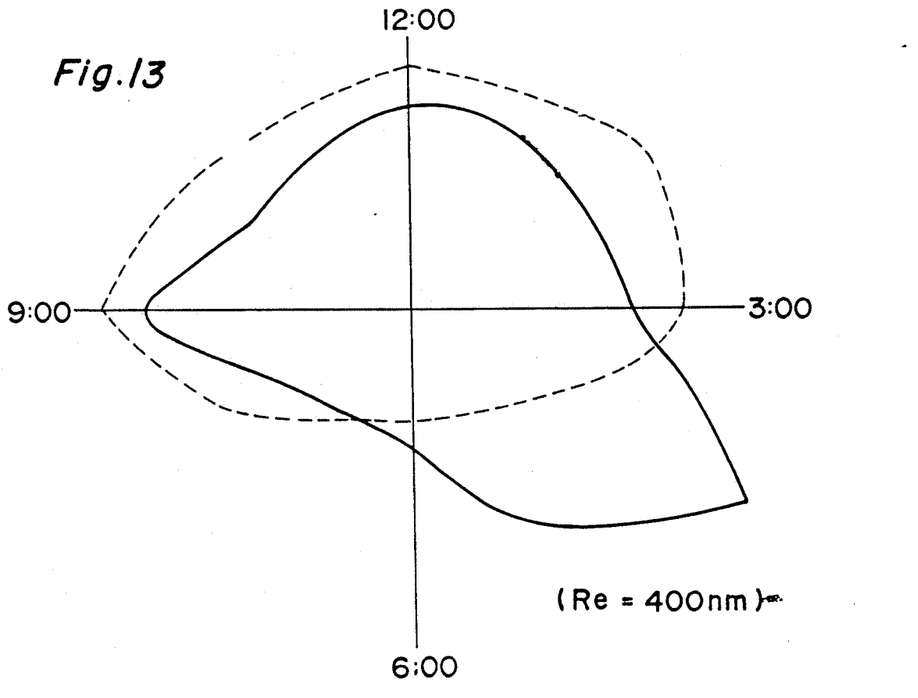

FIGS. 12 and 13 show the viewing angle characters of the present embodiment, wherein FIG. 12 shows the viewing angle character of the present embodiment when the retardation value in the normal direction of the biaxial oriented polymer film 14 is 250 nanometers, and FIG. 13 shows the viewing angle character of the present embodiment when the retardation value in the normal direction of the biaxial oriented polymer film 14 is 400 nanometers. In FIGS. 12 and 13, the solid looped lines show the viewing angle characters of the present embodiment corresponding to the contrast ratio equal or larger than 4 ($Co \geq 4$), and the broken looped lines show the viewing angle characters of a conventional supertwist type liquid crystal display fabricated by a conventional optical fabricating method disclosed in the Japanese Patent Application 2-011156 made by the present applicant, when corresponding to the contrast ratio equal or larger than 4 ($Co \geq 4$).

As shown in FIGS. 12 and 13, the larger the retardation value in the normal direction of the biaxial oriented polymer film, the wider the viewing angle character in a specific direction is expanded, and when the retardation value in the normal direction is 400 nanometers, the viewing angle character is remarkably expanded in a direction of 4:00 (4 o'clock direction). When the retardation value in the normal direction of the biaxial oriented polymer film is 250 nanometers, the value becomes near to a half of the retardation value (400 nm) in the plane of the third uniaxial oriented polymer film. Therefore, in the combination of the third uniaxial oriented polymer film 13 with the biaxial oriented polymer film 14, although the change of the retardation value with respect to the elevation angle $\psi$ is small, it is insufficient to expand the viewing angle character in a specific direction.

Figure 14:
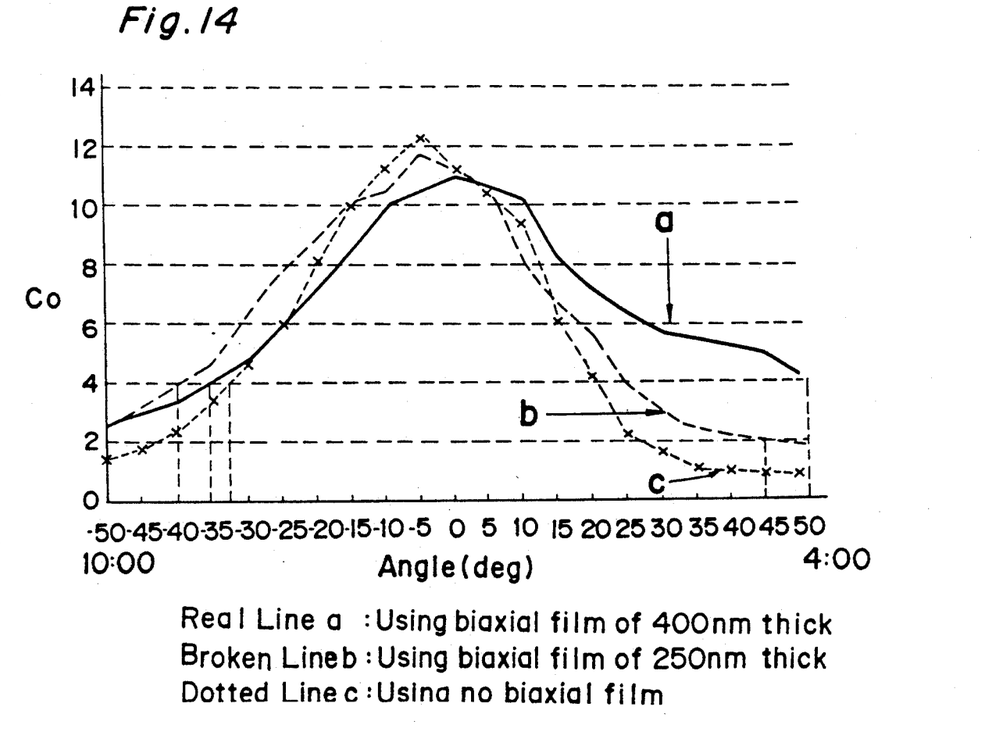
FIG. 14 is a graph view showing a relationship between a contrast ratio and an elevation angle in a direction from 10 o'clock to 4 o'clock.

FIG. 14 shows a relationship between the elevation angle represented by the horizontal axis and the contrast ratio represented by the vertical axis in the direction from 10 o'clock to 4 o'clock, i.e., the expanding direction of the viewing angle character when the retardation value of the biaxial oriented polymer film 14 is set to 400 nanometers in the present embodiment. In FIG. 14, a dotted line shows a graph data of FIG. 5 when the biaxial oriented polymer film 14 is not used, and a broken line shows a graph data when the retardation value of the biaxial oriented polymer film is 250 nanometers, and a real line shows a graph data when the retardation value of the biaxial oriented polymer film is 400 nanometers. In these cases, although the maximum contrast ratios in the perpendicular direction (i.e., normal direction) are not so much different within a range of 11 to 12.5, referring to the viewing angle characters when compared in the case of the contrast ratio of 4, the viewing angle characters are in the ranges of, approximately 54 degrees (i.e., from −33 to 21 degrees) when using no biaxial oriented polymer film, approximately 65 degrees (i.e., from −40 to 25 degrees) when using the biaxial oriented polymer film having its retardation value of 250 nanometers, and approximately 86 degrees (i.e., from −35 to 51 degrees) when using the biaxial oriented polymer film having its retardation value of 400 nanometers, that is, in this case, it is understood that the viewing angle character is remarkably expanded.

The direction of the viewing angle character to be expanded is made coincident with a specific direction of the viewing angle character required to be expanded in the liquid crystal display, whereby the viewing angle character in any specific direction can be expanded.

In addition, in the optical fabrication in FIG. 10, the order of disposing the first and second uniaxial oriented polymer films 11 and 12 may be reversed to that of the embodiment, and also the order of disposing the third uniaxial oriented polymer film 13 and the first biaxial oriented polymer film 14 may be reversed.

According to the present invention, the optical retardation film is fabricated by combining a uniaxial oriented polymer film having a small retardation in the normal direction and having a positive optical anisotropy with a biaxial oriented polymer film having an extremely small retardation in the plane and having a negative optical anisotropy, and the combined retardation film is so arranged that the change of the retardation with respect to the elevation angle is offset, thereby dissolving the defect of narrow viewing angle caused by color change and inversion of black/white display due to the elevation angle which are involved in the conventional black/white liquid crystal display of a retardation type. Accordingly, an achromatic liquid crystal display can be realized with a high contrast ratio having an expanded viewing angle character in a specific direction, thereby obtaining a liquid crystal display suitable for a high quality and large scaled display such as lap top type wordprocessors and note type personal computers.

Although the present invention has been fully described with reference to the accompanying drawings, it is to be noted here that various changes and modifications will be apparent to those skilled in the art without departing from the spirit and scope of the invention as defined by the appended claims.

What is claimed is:

1. A liquid crystal display with a supertwist type liquid crystal panel including a supertwist type liquid crystal layer interposed between upper and lower substrates, comprising:

a uniaxial oriented polymer film member having a positive optical anisotropy with a small retardation in a direction normal to a plane of said uniaxial oriented polymer film member; and a biaxial oriented polymer film having a negative optical anisotropy with a small phase difference not more than 20 nm in the plane of the film and a retardation value of 200 nm to 400 nm in a direction normal to said biaxial oriented polymer film, wherein said uniaxial oriented polymer film member and said biaxial oriented polymer film are disposed on opposite sides of said supertwist type liquid crystal panel so as to act as an optical compensator.

2. The liquid crystal display of claim 1, wherein said uniaxial oriented polymer film member includes first, second, and third uniaxial oriented polymer films such that an upper polarizer, said first uniaxial oriented polymer film, said second uniaxial oriented polymer film, said supertwist type liquid crystal layer, said third uniaxial oriented polymer film, said biaxial oriented polymer film, and a lower polarizer are sequentially arranged in this order.

3. The liquid crystal display of claim 2, wherein said first second, and third uniaxial oriented polymer films each have a thickness of 50 $\mu$m.

4. The liquid crystal display of claim 2, wherein said first, second, and third uniaxial oriented polymer films are made of polycarbonate or polyvinyl alcohol.

5. The liquid crystal display of claim 2, wherein said biaxial oriented polymer film has a thickness of 0.2 to 0.3 mm.

6. The liquid crystal display of claim 2, wherein said biaxial oriented polymer film is made of polystyrene or polymethylmethacrylate.

7. The liquid crystal display according to claim 2, wherein a slow axis of said first uniaxial oriented polymer film and a slow axis of said second uniaxial oriented polymer film form an angle of 25 to 35 degrees, wherein an angle formed by the slow axis of said second uniaxial oriented polymer film and an orientation axis of liquid crystal molecules of said lower substrate is greater than an angle formed by an orientation axis of liquid crystal molecules of said upper substrate and said orientation axis of liquid crystal molecules of said lower substrate, in a counterclockwise direction, wherein an angle formed by a slow axis of said third uniaxial oriented polymer film and said slow axis of said first uniaxial oriented polymer film is greater than an angle formed by said orientation axis of liquid crystal molecules of said lower substrate and said slow axis of said first uniaxial oriented polymer film, in a counterclockwise direction, wherein an absorption axis of said upper polarizer is set at an orientation of approximately 15 degrees in a counterclockwise direction from the slow axis of said first uniaxial oriented polymer film, wherein an absorption axis of said lower polarizer is set at an orientation of approximately 50 degrees in the counterclockwise direction from the slow axis of said third uniaxial oriented polymer film, wherein a retardation value in a normal direction of said biaxial oriented polymer film is approximately equal to a retardation value in a plane of said third uniaxial oriented polymer film, and wherein the orientation axis of the liquid crystal molecules of said upper substrate or the slow axis of said third uniaxial oriented polymer film is set in a direction of viewing.

8. The liquid crystal display of claim 7, wherein said slow axis of said first uniaxial oriented polymer film and said slow axis of said second uniaxial oriented polymer film form an angle of 30 degrees.

9. The liquid crystal display of claim 1, further comprising upper and lower orientation films on opposite sides and directly adjacent to said supertwist type liquid crystal layer, wherein said upper and lower orientation films are made of an organic polymer.

10. The liquid crystal display of claim 1, wherein said supertwist type liquid crystal layer is twisted 240 degrees in a clockwise direction.

11. The liquid crystal display of claim 1, wherein the retardation value of said biaxial oriented polymer film is 250 nm in the normal direction.

12. The liquid crystal display of claim 1, wherein the retardation value of said biaxial oriented polymer film is 400 nm in the normal direction.

13. The liquid crystal display of claim 1, wherein as the retardation value of said biaxial oriented polymer in the normal direction is increased, a viewing angle in a specific direction is expanded.

14. The liquid crystal display of claim 13, wherein the viewing angle in the specific direction is 65 degrees when the retardation value is 250 nm and 86 degrees when the retardation value is 400 nm.

* * * * *